United States Patent
Fan et al.

(10) Patent No.: US 8,762,466 B2
(45) Date of Patent: Jun. 24, 2014

(54) METHOD AND APPARATUS FOR NOTIFYING CONVERGED ADDRESS BOOK SERVICE INFORMATION

(75) Inventors: Shunan Fan, Beijing (CN); Lei Wang, Beijing (CN); Ting Dong, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 280 days.

(21) Appl. No.: 13/036,375

(22) Filed: Feb. 28, 2011

(65) Prior Publication Data

US 2011/0153760 A1 Jun. 23, 2011

Related U.S. Application Data

(63) Continuation of application No. PCT/CN2009/073354, filed on Aug. 19, 2009.

(30) Foreign Application Priority Data

Aug. 26, 2008 (CN) .......................... 2008 1 0147291

(51) Int. Cl.
  *G06F 15/16* (2006.01)
(52) U.S. Cl.
  USPC ............ 709/206; 709/217; 709/223; 709/226
(58) Field of Classification Search
  USPC .................................. 709/206, 217, 223, 226
  See application file for complete search history.

(56) References Cited

U.S. PATENT DOCUMENTS 6,564,261 B1 * 5/2003 Gudjonsson et al. ......... 709/227
7,702,726 B1 * 4/2010 Grabelsky et al. ............ 709/204
2005/0289474 A1   12/2005 Master et al.
2007/0097994 A1 * 5/2007 Samdadiya et al. .......... 370/401
2009/0182821 A1 * 7/2009 Allen et al. ................... 709/206

FOREIGN PATENT DOCUMENTS

CN    101022429 A    8/2007
CN    101159569 A    4/2008

OTHER PUBLICATIONS

3GPP TS 29.199-14 V7.1.0 "3$^{rd}$ Generation Partnership Proj Technical Specification Group Core Network 3GPP Terminals; Open Service Access (OSA); Parlay X Web Services; Part 14: Presence (Release 7)", pp. 1-23, (2005).
Partial Translation of Second Chinese Office Action of counterpart Chinese Application No. 200810147291.1 mailed Feb. 21, 2012.
First Chinese Office Action issued in related Chinese Application No. 200810147291.1 Mailing Date: May 25, 2011, Huawei Technologies Co., Ltd.
Champagne, Darryl, "OMA-DS-2008-0066-INP_QandA_with_MWG_CAB," OMA Open Mobile Alliance, Jun. 2008.

(Continued)

*Primary Examiner* — Liangche A Wang
(74) *Attorney, Agent, or Firm* — Leydig, Voit & Mayer, Ltd.

(57) ABSTRACT

A method and an apparatus for notifying Converged Address Book (CAB) service information are disclosed. The method includes: receiving a request message from a second CAB user; judging whether to notify a first CAB user according to the request message and/or instruction information of the first CAB user; and sending the notification message to the first CAB user if determining to notify the first CAB user. With the present invention, the CAB service information can be notified, and the user experience is improved.

18 Claims, 6 Drawing Sheets

(56) References Cited

OTHER PUBLICATIONS

Extended European Search Report dated (mailed) Aug. 10, 2011, issued in related Application No. 09809216.6-2221 / 2323341, PCT/CN2009073354, Hauwei Technologies Co., Ltd.

Written Opinion of the International Searching Authority (translation) dated (mailed) Nov. 26, 2009, issued in related Application No. PCT/CN2009/073354, filed Aug. 19, 2009, Huawei Technologies Co., Ltd.

Notice from the European Patent Office dated Oct. 1, 2007, concerning business methods, Official Journal EPO, pp. 592-593, Nov. 2007.

3rd Office Action in corresponding Chinese Patent Application No. 200810147291.1 (Oct. 31, 2012).

Open Mobile Alliance (OMA), "Converged Address Book Architecture Draft Version 1.0—Jul. 27, 2008", Open Mobile Alliance OMA-AD-CAB-V1_0-20080727-D, pp. 1-15, (Jul. 27, 2008).

Open Mobile Alliance (OMA), "Converged Address Book Architecture Draft Version 1.0—Aug. 25, 2008", Open Mobile Alliance OMA-AD-CAB-V1_0-20080825-D, pp. 1-14, (Aug. 25, 2008).

Open Mobile Alliance (OMA), "Converged Address Book Requirements Draft Version 1.0—Jul. 15, 2008", Open Mobile Alliance OMA-RD-CAB-V1_0-20080715-D, pp. 1-24, (Jul. 15, 2008).

Doc# OMA-WID_0155-CAB-V1_0-20071009-A, "Converged Address Book", CAB 0155, 2007 Open Mobile Alliance Ltd. pp. 1-3, (2007).

International Search Report from the Chinese Patent Office in International Application No. PCT/CN2009/073354, mailed Nov. 26, 2009.

* cited by examiner

METHOD AND APPARATUS FOR NOTIFYING CONVERGED ADDRESS BOOK SERVICE INFORMATION

CROSS-REFERENCE TO RELATED APPLICATIONS

This application is a continuation of International Application No. PCT/CN2009/073354, filed on Aug. 19, 2009, which claims priority to Chinese Patent Application No. 200810147291.1, filed on Aug. 26, 2008, both of which are hereby incorporated by reference in their entireties.

FIELD OF THE INVENTION

The present invention relates to data communication technologies, and in particular, to a method and an apparatus for notifying Converged Address Book (CAB) service information.

BACKGROUND OF THE INVENTION

Nowadays, communication technologies are developing rapidly, and everyone has contact information on his/her communication devices. Through the communication devices, users receive and send messages to the contacts or perform the corresponding application operation anytime anywhere. The contact information is important to the users, and is essential for communications.

Currently, as communication systems are evolving toward all-IP (Internet Protocol) networks, diverse flexible services emerge, and the communication devices provide rich functions. The address book function is a basic function of such services. In the prior art, a user needs to process plural address books, for example, an address book stored in a telephone, an address book stored in a Subscriber Identity Module (SIM), a service-based address book, and an address book provided by an Internet Service Provider (ISP), which brings inconvenience to the user, deteriorating the user experience. To enhance the user experience, a uniform address book standard is needed. The prior art puts forward a Converged Address Book (CAB) service to back up plural address books of the user to the network so that the user can retrieve the address books from the network, modify the contents of the address books, exchange personal information with other contacts, and update the personal information. However, the prior art provides no detailed solution.

SUMMARY OF THE INVENTION

The embodiments of the present invention provide a method and an apparatus for notifying CAB service information so that a CAB user can know the updated contact information after CAB user information is updated.

A method for notifying CAB service information in an embodiment of the present invention includes:
  receiving a request message from a second CAB user;
  judging whether to notify a first CAB user according to the request message and/or instruction information of the first CAB user; and
  sending a notification message to the first CAB user if determining to notify the first CAB user.

A method for notifying CAB service information in an embodiment of the present invention includes:
  receiving a message for activating a CAB service from a second user;
  judging whether to send a notification message according to instruction information of a first CAB user if the second user is a contact specified in contact directory information of the first CAB user; and
  sending the notification message to the first CAB user if determining to notify the first CAB user.

An apparatus for notifying CAB service information in an embodiment of the present invention includes:
  an information subscribing unit, configured to receive a request message from a second CAB user;
  a notification controlling unit, connected to the information subscribing unit, and configured to judge whether it is necessary to notify a first CAB user according to instruction information of the first CAB user, and generate a notification message when it is necessary to notify the first CAB user; and
  a notifying unit, configured to send the notification message generated by the notification controlling unit to the first CAB user.

An apparatus for notifying CAB service information in an embodiment of the present invention includes:
  a service activating unit, configured to receive a message for activating a CAB service from a second user;
  a judging unit, connected to the service activating unit, and configured to judge whether the second user is a contact specified in contact directory information of a first CAB user;
  a notification controlling unit, configured to judge whether it is necessary to notify the first CAB user according to instruction information of the first CAB user if a judgment result of the judging unit is positive, and generate a notification message when it is necessary to notify the first CAB user; and
  a notifying unit, configured to send the notification message generated by the notification controlling unit to the first CAB user.

Through the method and apparatus for notifying CAB service information provided by the embodiments of the present invention, when another user requests relevant information from a CAB user, or when a contact specified in the address book of a CAB user changes from a non-CAB user to a CAB user, a notification message is sent to the CAB user according to the instruction information of this CAB user. Therefore, the CAB user can acknowledge contact information in time, and the user experience is improved.

DETAILED DESCRIPTION OF THE EMBODIMENTS

To make the technical solution under the present invention clearer to those skilled in the art, the following describes the technical solution under the present invention in more details with reference to the accompanying drawings and exemplary embodiments. Evidently, the accompanying drawings are exemplary only, and those skilled in the art can derive other drawings from such accompanying drawings without any creative effort.

In the embodiments of the present invention, the CAB user can publish his/her contact directory information (including personal information and address book information) to a desired server for storing, and can update, modify or delete the address book of the CAB user. Other CAB users may subscribe to the contact directory information, and the latest contact information can be published to other CAB users.

When publishing information, the CAB user can specify whether the CAB user needs to be notified when another CAB user subscribes to personal information published by the CAB user that publishes the information, or when another CAB user adds the CAB user that publishes the information as a contact. Likewise, when the CAB user that publishes the information expects to become a contact of the opposite party, the CAB user that publishes the information can add the opposite party as a contact according to the instruction of the opposite party. Such a notification mechanism may also be set according to the user preference, or may be an operator policy for choosing whether to send a notification message to the user.

In the method for notifying CAB service information in this embodiment, the apparatus receives a request message from the second CAB user, and then judges whether to notify the first CAB user according to the request message and the instruction information of the first CAB user; and, if the first CAB user needs to be notified, sends a notification message to the first CAB user. The request message of the second CAB user may be a request message that requests the information published by the first CAB user, or a request message that requests adding of the first CAB user as a contact.

In the following description, it is assumed that the second CAB user requests the information published by the first CAB user.

Figure 1:
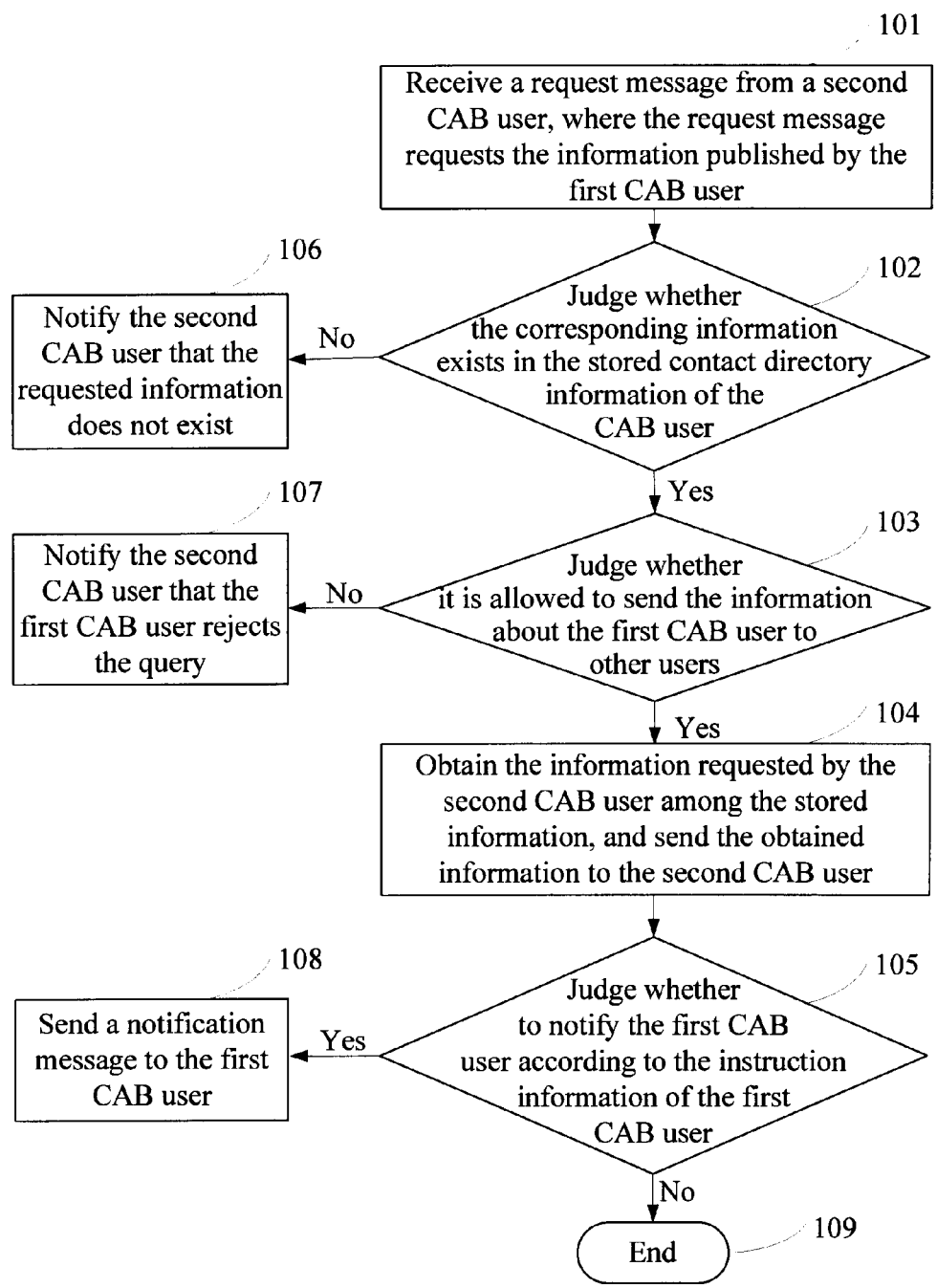
FIG. 1 is a flowchart of a method for notifying CAB service information in a first embodiment of the present invention.

FIG. 1 is a flowchart of a method for notifying CAB service information in the first embodiment of the present invention. The method includes the following steps:

Step 101: Receive a request message from a second CAB user, where the request message requests the information published by a first CAB user.

The request message comes in many types, for example, a request message that requests the contact directory information published by the first CAB user, where the contact directory information may include personal information and/or contact information.

Step 102: Check whether the corresponding information (such as the information requested by the second CAB user, or the information about the first CAB user) exists in the stored contact directory information of the CAB user; if the corresponding information exists, perform step 103; if the corresponding information does not exist, perform step 106.

When the CAB user registers with the server, the CAB user may publish the CAB user's contact directory information.

For example, the first CAB user publishes the contact directory information by a PUBLISH message. The PUBLISH message may further carry instruction information, indicating whether to send a corresponding notification message to the first CAB user when another CAB user requests (for example, requests subscription to, or query) the information about the first CAB user and/or adds the first CAB user as a contact. In this way, after receiving the information published by the CAB user, the server stores such information so that other CAB users can subscribe to or query the information. The instruction information may be preference information set by the user, or an operator policy for choosing whether to send a notification message to the user.

Step 103: Judge whether it is allowed to send the information about the first CAB user to another user; if it is allowed to send the information about the first CAB user to another user, perform step 104; if it is not allowed to send the information about the first CAB user to another user, perform step 107.

The information about the first CAB user may be the information requested by the second CAB user or other information related to the first CAB user.

In the foregoing judging process, the judgment may be made according to the query policy set by the first CAB user or by querying the first CAB user.

The query policy may be set by the CAB user at the time of registration, and stored on the corresponding server; or carried in a message of publishing the contact directory information of the CAB user.

The query policies include but are not limited to at least one piece of the following information:

request rights information: it indicates when another CAB user requests the contact directory information of this user, the corresponding information is sent to the requesting party according to the rights set by the user; different request rights are set for different CAB users; and the corresponding information can be sent according to the capabilities of the requesting party;

storage and forwarding rights information: it indicates whether the information sent to the requesting party according to the rights set by the user can be stored and/or forwarded by the requesting party after the requesting party obtains the information requested; and security information: it indicates when another CAB user requests the contact directory information of this user, the identity of the requesting party and the security information need to be authenticated to verify whether the requesting party is legal.

Step 104: Obtain the information that is published by the first CAB user and requested by the second CAB user among the stored contact directory information of the CAB user, and send the obtained information to the second CAB user.

Step 105: Judge whether it is necessary to notify the first CAB user according to the instruction information of the first CAB user; if it is necessary to notify the first CAB user, perform step 108; if it is not necessary to notify the first CAB user, perform step 109.

Step 106: Notify the second CAB user that the requested information does not exist.

Step 107: Notify the second CAB user that the first CAB user rejects the query.

Step 108: A notification message is sent by the second CAB user to the first CAB user.

Embodiments of the present invention do not restrict the type of the notification message. The notification message may be a message such as a Session Initiation Protocol (SIP)

message, or a Hypertext Transfer Protocol (HTTP) message, or a Short Message Service (SMS) message, or a signaling message, etc.

Step 109: End.

It should be noted that step 103 is optional, and may be omitted according to the circumstances.

In the following description, it is assumed that the second CAB user requests adding of the first CAB user as a contact.

Figure 2:
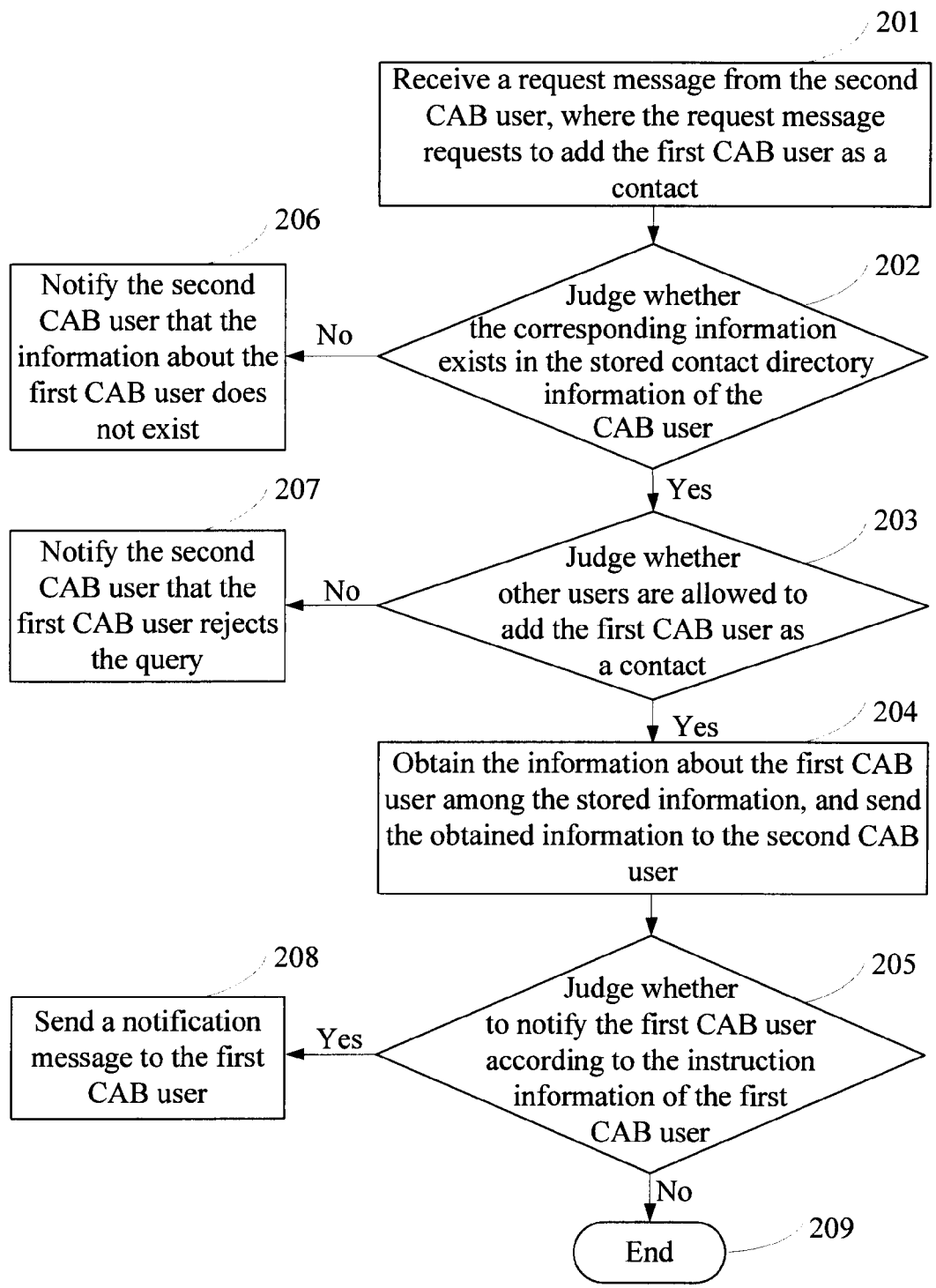
FIG. 2 is a flowchart of a method for notifying CAB service information in a second embodiment of the present invention.

FIG. 2 is a flowchart of a method for notifying CAB service information in the second embodiment of the present invention. The method includes the following steps:

Step 201: Receive a request message from the second CAB user, where the request message requests adding of the first CAB user as a contact.

Step 202: Check whether the corresponding information exists in the stored contact directory information of the CAB user; if the corresponding information exists, perform step 203; if the corresponding information does not exist, perform step 206.

When the CAB user registers with the server, the CAB user may publish the CAB user's contact directory information. For example, the first CAB user publishes the contact directory information by a PUBLISH message. The PUBLISH message may carry instruction information, indicating whether to send a corresponding notification message to the first CAB user when another CAB user requests (for example, subscribes to, or queries) the information about the first CAB user and/or adds the first CAB user as a contact. In this way, after receiving the information published by the CAB user, the server stores such information so that other CAB users can subscribe to or query the information. The instruction information may be preference information set by the user, or an operator policy for selecting whether to send a notification message to the user.

Step 203: Judge whether other CAB users are allowed to add the first CAB user as a contact; if other CAB users are allowed to add the first CAB user as a contact, perform step 204; if other CAB users are not allowed to add the first CAB user as a contact, perform step 207.

In the foregoing judging process, the judgment may be made according to the query policy set by the first CAB user or by querying the first CAB user.

Step 204: Obtain the information about the first CAB user from the stored contact directory information of the CAB user, and send the obtained information to the second CAB user.

Step 205: Judge whether it is necessary to notify the first CAB user according to the instruction information of the first CAB user; if it is necessary to notify the first CAB user, perform step 208; if it is not necessary to notify the first CAB user, perform step 209.

Step 206: Notify the second CAB user that the information about the first CAB user does not exist.

Step 207: Notify the second CAB user that the first CAB user rejects the query.

Step 208: A notification message is sent by the second CAB user to the first CAB user.

Embodiments of the present invention do not restrict the type of the notification message. The notification message may be a SIP message, or an HTTP message, or an SMS message, or a signaling message, etc.

Step 209: End.

It should be noted that step 203 is optional, and may be omitted according to the circumstances.

Figure 3:
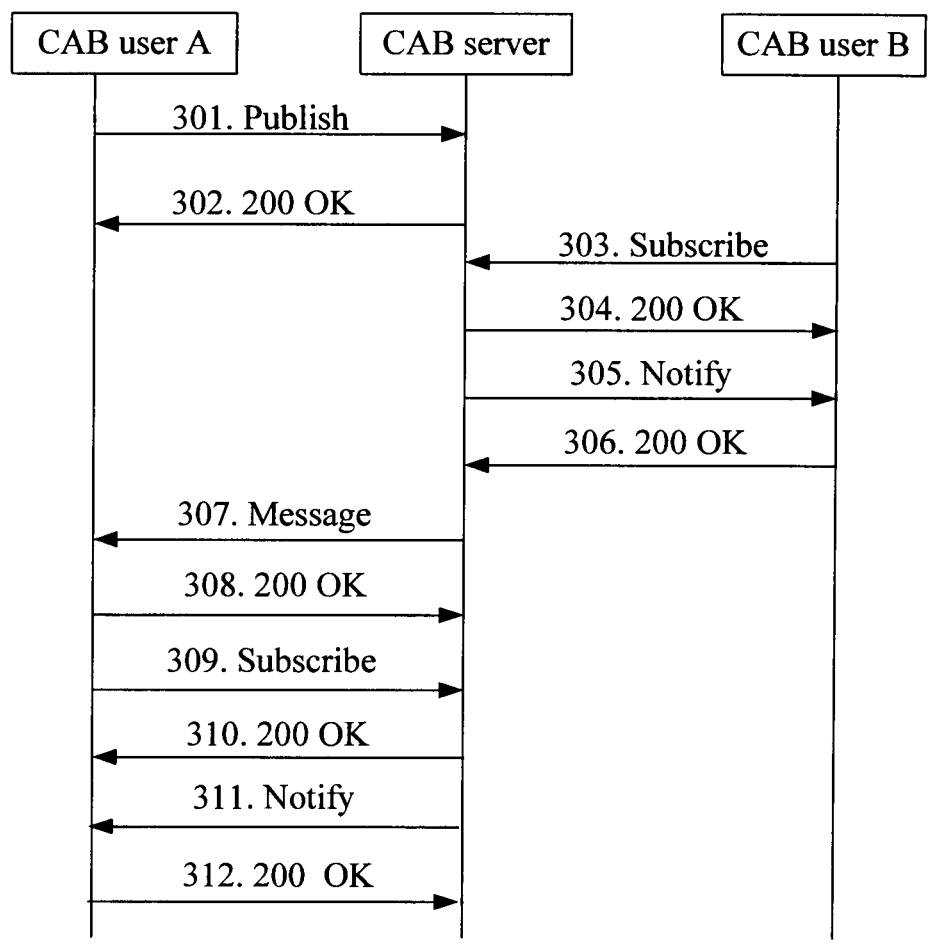
FIG. 3 is a flowchart of message interactions between a CAB user and a CAB server in the first embodiment and the second embodiment of the present invention.

As shown in FIG. 3, taking a SIP message as an example, the message interaction between a CAB user and a CAB server in the foregoing embodiments includes the following detailed steps:

Step 301: CAB user A uses a PUBLISH message to publish his/her contact directory information to the CAB server. The contact directory information may carry instruction information, for example, instruction information indicating whether to send a corresponding notification message to CAB user A when another CAB user subscribes to the information about the CAB user A and/or adds CAB user A as a contact. The instruction information may be a link, and may be carried in a message header field or a message body. Or, the instruction information may be preference information set by the user, or an operator policy for choosing whether to send a notification message to the user.

Step 302: The CAB server receives the PUBLISH message sent by CAB user A, and performs an operation according to the instruction information, for example, stores the corresponding information.

Step 303: CAB user B sends a SUBSCRIBE message to the CAB server to subscribe to the information published by CAB user A.

Step 304: After receiving the message, the CAB server returns a 200 OK message to CAB user B.

Step 305: The CAB server determines that the information subscribed to by CAB user B exists in the stored information, and the subscription of CAB user A indicates allowing sending of information to CAB user B. Consequently, the CAB server sends a NOTIFY message to CAB user B. This message carries the information subscribed to by CAB user B.

The CAB server may select the information subscribed to by CAB user B according to the query policy set by CAB user A, and send the selected information to CAB user B.

Step 306: After receiving the NOTIFY message, CAB user B performs a corresponding operation, for example, stores the information or sends it to the corresponding application.

Step 307: The CAB server sends a MESSAGE notification message to user A, notifying that it CAB has subscribed to information about user A with user B. This message may be replaced by a PUBLISH message, another SIP message, an SMS message, or a signaling message, etc.

Step 308: After receiving this notification message, CAB user A returns a 200 OK message.

Steps 309-312 are the same as steps 303-306.

It should be noted that in the foregoing message interaction process, step 303 and step 304 may be performed before step 301 and step 302. That is, the information publishing process of CAB user A is independent of the information subscribing process of CAB user B, and either of them is not certainly before or after the other.

When CAB user A needs to update his/her contact directory information, step 301 and step 302 can be performed to update, modify or delete the contact directory information. Afterward, step 305 and step 306 can be performed so that the subscriber can update the corresponding information.

By using the method for notifying CAB service information in this embodiment, after other CAB users subscribe to the information about a CAB user and are notified of the information, the CAB user is notified. In this way, the CAB user keeps aware of the relevant contact information, and the user experience is improved.

In an embodiment of the present invention, when the contact in the contact directory information of the first CAB user changes from a non-CAB user to a CAB user, whether to notify the first CAB user may also be determined according to instruction information of the first CAB user, and a notification message will be sent to the first CAB user if the first CAB user needs to be notified. This will be detailed below through a separate example.

Figure 4:
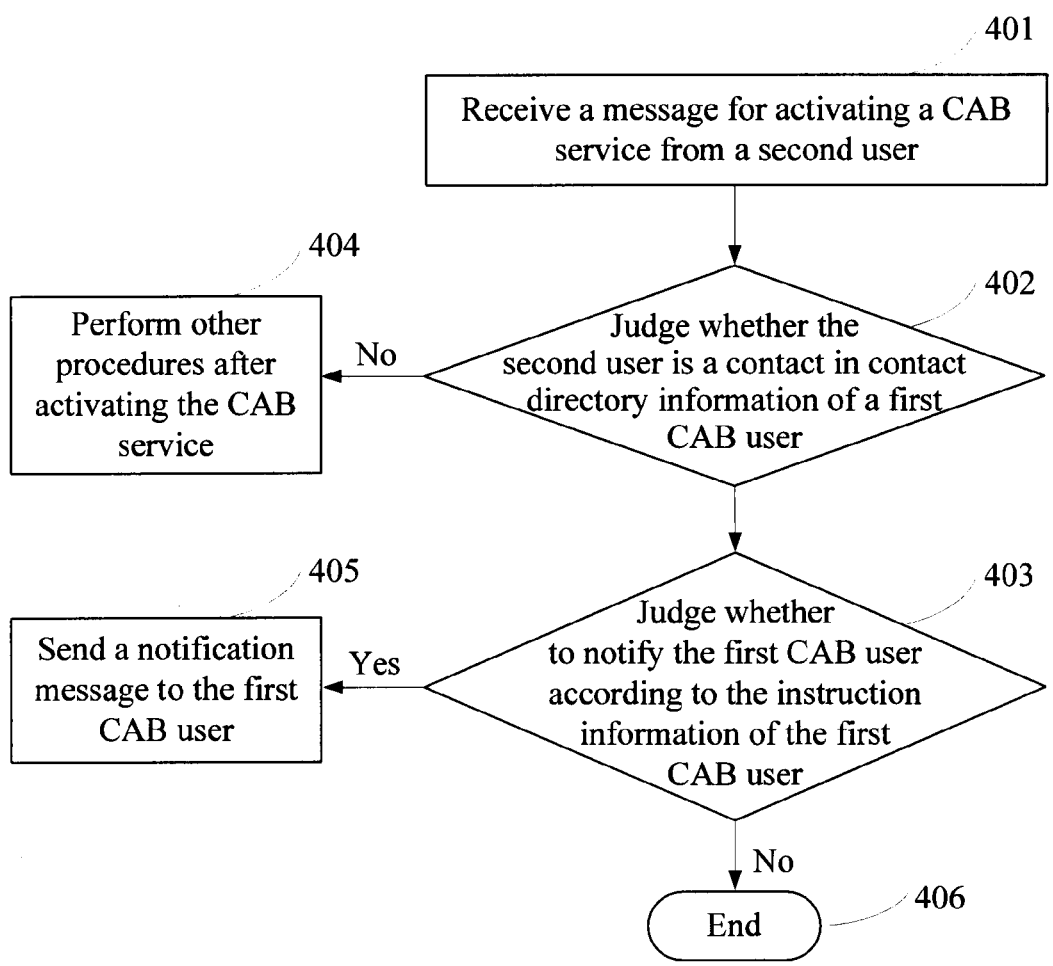
FIG. 4 is a flowchart of a method for notifying CAB service information in a third embodiment of the present invention.

As shown in FIG. 4, a method for notifying CAB service information in the third embodiment of the present invention primarily includes the following steps:

Step 401: Receive a message for activating a CAB service from a second user.

Step 402: Judge whether the second user is a contact in the contact directory information of the first CAB user; if the second user is a contact in the contact directory information of the first CAB user, perform step 403; if the second user is not a contact in the contact directory information of the first CAB user, perform step 404.

When the CAB user registers with the server, the CAB user may publish CAB user's contact directory information. For example, the first CAB user publishes the contact directory information by a PUBLISH message. The PUBLISH message may further carry instruction information, indicating whether to send a corresponding notification message to the first CAB user when another CAB user subscribes to the information about the first CAB user and/or adds the first CAB user as a contact. In this way, after receiving the information published by the CAB user, the server stores such information so that the CAB user can be notified of the changed contact information in the address book in time. The instruction information may be preference information set by the user, or an operator policy for selecting whether to send a notification message to the user.

Step 403: Judge whether it is necessary to notify the first CAB user according to the instruction information of the first CAB user; if it is necessary to notify the first CAB user, perform step 405; if it is not necessary to notify the first CAB user, perform step 406.

Step 404: Perform the remaining procedure after activating the CAB service.

Step 405: Send a notification message to the first CAB user.

Embodiments of the present invention do not restrict the type of the notification message. The notification message may be a SIP message, or an HTTP message, or an SMS message, or a signaling message, etc.

Step 406: End.

Figure 5:
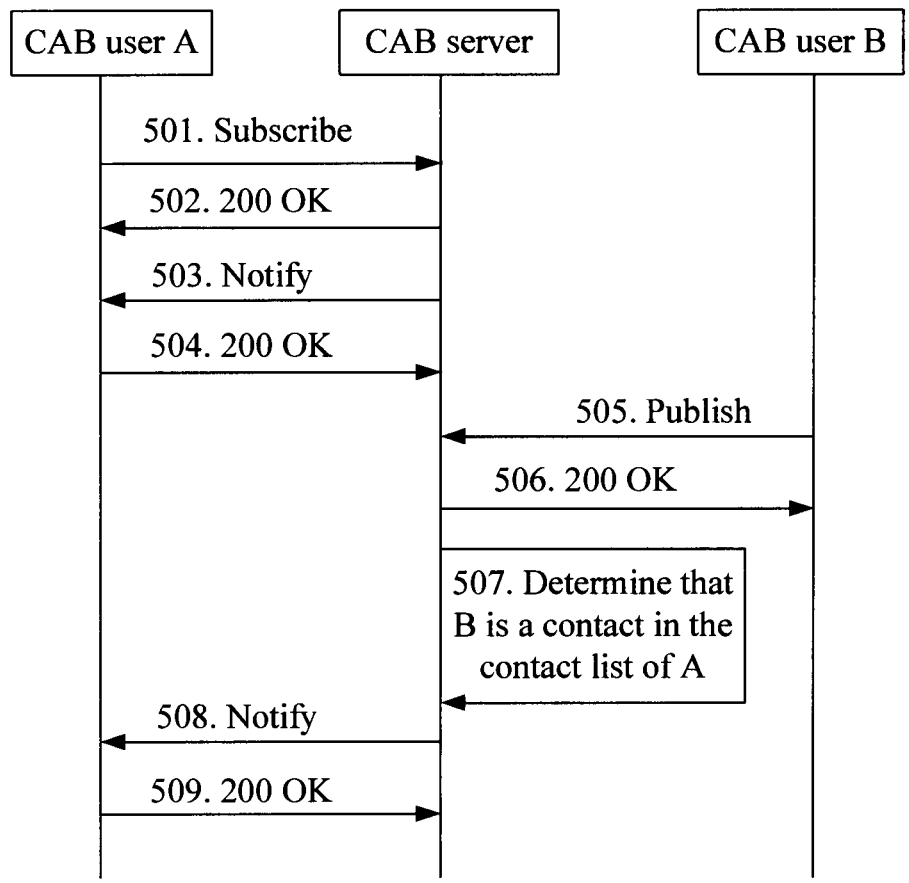
FIG. 5 is a flowchart of message interactions between a CAB user and a CAB server in the third embodiment of the present invention.

As shown in FIG. 5, taking a SIP message as an example, the message interaction between a CAB user and a CAB server includes the following detailed steps:

Step 501: CAB user A activates the CAB service, and sends a SUBSCRIBE message to a CAB server to publish contact information of CAB user A.

Step 502: The CAB server returns a 200 OK message to CAB user A.

Step 503: The CAB server sends a NOTIFY message to CAB user A, indicating that the subscribed service is activated successfully.

Step 504: CAB user A returns a 200 OK message to the CAB server.

Step 505: User B activates the CAB service. The activation process may be: A corresponding message is sent to the CAB server; after user B becomes a CAB user successfully, user B sends its personal information and/or contact information to the CAB server through a PUBLISH message. The PUBLISH message may be replaced by another SIP message such as a REGISTER message or a SUBSCRIBE message, or an SMS message. Alternatively, the CAB service is activated through network registration, or through a customer service, etc.

Step 506: The CAB server returns a 200 OK message to CAB user B.

Step 507: After knowing that user B has become a CAB user, the CAB server judges whether user B is a contact in the contact list of user A.

Step 508: The CAB server sends a NOTIFY message to CAB user A, indicating that user B becomes a CAB user. This message may also carry relevant information to CAB user A.

Step 509: After receiving this message, CAB user A returns a 200 OK message.

By using the method for notifying CAB service information in this embodiment, a CAB user can be notified of its contact change after the contact changes from a non-CAB user to a CAB user. Therefore, the CAB user keeps aware of the updated contact information and enjoys a better experience.

In all the embodiments above, the contact directory information of a user may be stored in a corresponding server in the form of data for the purpose of maintenance.

The methods in the embodiments of the present invention are applicable to many types of terminal, and can be used by multiple different service engines and applied across different networks. The CAB provides consistent contact directory information on different services and applications. A CAB user can publish his/her contact directory information (including personal information and address book information) to the corresponding server for storing, and can retrieve the address book from the corresponding server. Meanwhile, the CAB user can perform operations on the address book of the CAB user, such as updating, modifying and deleting the address book. Other CAB users may subscribe to the contact directory information, and the latest contact information can be published to other CAB users. For example, when a user owns a mobile phone, a Personal Digital Assistant (PDA), and a Personal Computer (PC) simultaneously, such devices can share the contact information of an address book according to user settings. Among the devices that share the address book information, if contact directory information in one of the devices changes, the contact directory information on other devices can be updated by using the method disclosed herein, namely, the data can be synchronized between the devices, thus improving the user experience and facilitating the use.

Persons skilled with ordinary knowledge in the art should understand that all or part of the steps of the method under the present invention may be implemented by relevant hardware under instruction of a program. The program may be stored in a computer readable storage medium. When the program runs, the steps of the method specified in any of the embodiments above can be performed. The storage medium may be a magnetic disk, a Compact Disk-Read Only Memory (CD-ROM), a Read Only Memory (ROM), or a Random Access Memory (RAM), etc.

Figure 6:
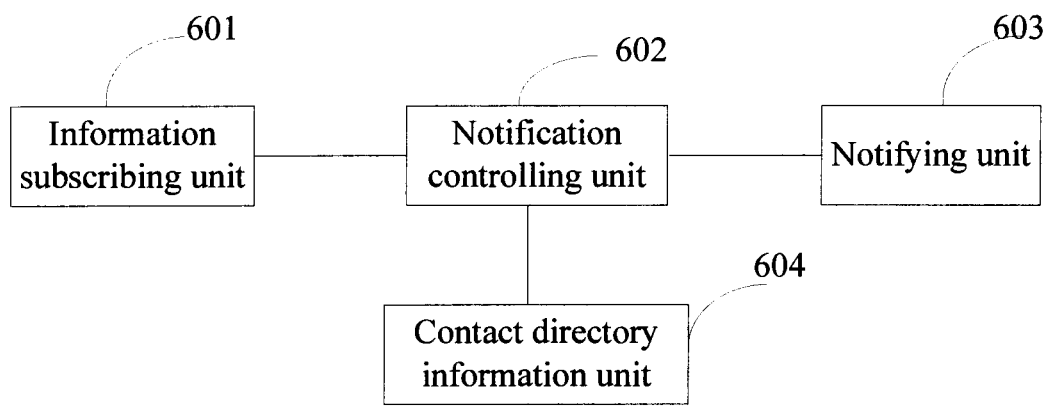
FIG. 6 shows a structure of an apparatus for notifying CAB service information in the first embodiment of the present invention.

FIG. 6 shows a structure of an apparatus for notifying CAB service information in the first apparatus embodiment of the present invention. As shown in FIG. 6, the apparatus includes an information subscribing unit 601, a notification controlling unit 602, and a notifying unit 603, and optionally, an contact directory information unit 604, as described below:

The information subscribing unit 601 is configured to receive a request message from the second CAB user, where the request message may be a request message that requests the information published by the first CAB user, or a request message that requests adding of the first CAB user as a contact.

The notification controlling unit 602 is connected to the information subscribing unit 601, and is configured to determine whether it is necessary to notify a first CAB user according to instruction information of the first CAB user, and generate a notification message when it is necessary to notify the first CAB user.

The notifying unit 603 is configured to send the notification message generated by the notification controlling unit 602 to the first CAB user.

The contact directory information unit 604 is connected to the notification controlling unit 602, and is configured to receive and store the contact directory information published by the first CAB user and/or the instruction information of the first CAB user.

Besides, depending on the instruction information published by the first CAB user, the notification controlling unit 602 is further configured to: when the contact in the contact directory information of the first CAB user in the contact directory information unit 604 changes from a non-CAB user to a CAB user, judge whether it is necessary to notify the first CAB user according to instruction information of the first CAB user, and generate a notification message when it is necessary to notify the first CAB user.

The process of notifying CAB service information through the foregoing apparatus has been detailed in the method embodiment above.

The information subscribing unit 601 is further configured to store and manage a subscription relation of the CAB user; when the contact directory information of the CAB user changes, the CAB user sends the changed information to the contact directory information unit 604, and the contact directory information unit 604 notifies the notification controlling unit 602; and the notification controlling unit 602 queries the information subscribing unit 601 about the subscription relation, and generates a corresponding notification message; and the notifying unit 603 sends the notification message. For example, the notification controlling unit 602 finds the users who have subscribed to the information of the CAB user, and have indicated the need of notifying the change of the CAB user information to such users; and consequently notifies such users. This notification may be implemented by a SIP message.

It should be noted that the units in the apparatus for notifying CAB service information in this embodiment are categorized in terms of functions only. In practice, one or more of the units may be integrated on the same physical entity. For example, the notification controlling unit 602 and the notifying unit 603 may be integrated on the same physical entity, and the information subscribing unit 601 and the notification controlling unit 602 may be integrated on the same physical entity. Besides, a unit may be logically divided into different logical subunits. For example, the receiving of the SUBSCRIBE message is logically separated from the maintenance of subscribed information. That is, the information subscribing unit 601 is divided into a receiving subunit and a subscribed information maintaining subunit.

By using the apparatus for notifying CAB service information in this embodiment, after other CAB users subscribe to the information about a CAB user, the CAB user is notified. In this way, the CAB user keeps aware of the relevant contact information, and the user experience is improved.

Figure 7:
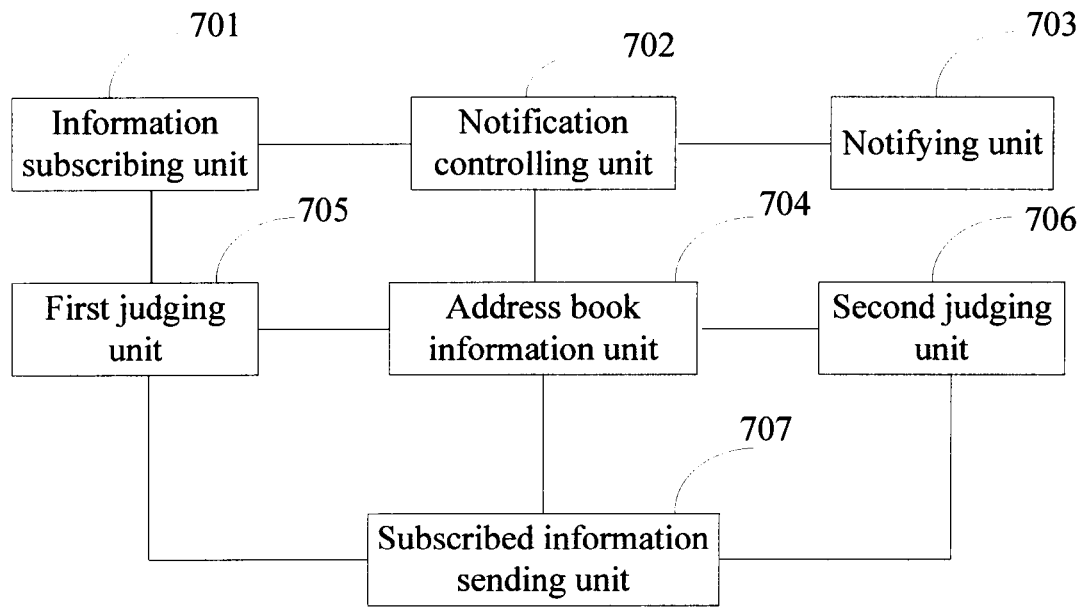
FIG. 7 shows a structure of an apparatus for notifying CAB service information in the second embodiment of the present invention.

FIG. 7 shows a structure of an apparatus for notifying CAB service information in the second apparatus embodiment of the present invention.

The apparatus in this embodiment includes: an information subscribing unit 701, a notification controlling unit 702, a notifying unit 703, and an contact directory information unit 704. Such units are the same as the counterparts in the embodiment shown in FIG. 6, and are not detailed further here.

In addition, the apparatus includes:

a first judging unit 705, connected to the information subscribing unit 701 and the contact directory information unit 704, and configured to judge whether it is allowed to send information about a first CAB user to other users or whether other users are allowed to add the first CAB user as a contact according to the query policy set by the first CAB user or by querying the first CAB user after the information subscribing unit 701 receives a message from a second CAB user, where the message is intended to subscribe to the contact directory information published by the first CAB user and/or add the first CAB user as a contact;

a second judging unit 706, connected to the contact directory information unit 704, and configured to judge whether it is allowed to send information about the first CAB user to other users or whether other users are allowed to add the first CAB user as a contact according to the query policy set by the first CAB user or by querying the first CAB user after the contact directory information of the first CAB user in the contact directory information unit 704 changes; and a subscribed information sending unit 707, connected to the first judging unit 705, the second judging unit 706, and the contact directory information unit 704 respectively, and configured to obtain information subscribed to by the second CAB user among the information stored in the contact directory information unit 704 and send the information to the second CAB user if the judgment result of the first judging unit 705 or the second judging unit 706 is positive.

The process of notifying CAB service information through the foregoing apparatus has been detailed in the method embodiment above.

Likewise, the units in the apparatus for notifying CAB service information in this embodiment are categorized in terms of functions only. In practice, one or more of the units may be integrated on the same physical entity. For example, the first judging unit 705 and the second judging unit 706 may be integrated on the same physical entity; or the first judging unit 705, the second judging unit 706, and the subscribed information sending unit 707 may be integrated on the same physical entity.

By using the apparatus for notifying CAB service information in this embodiment, the CAB user can publish his/her contact directory information (including personal information and address book information) to the corresponding server for storing, and can retrieve the address book from the corresponding server. Meanwhile, the CAB user can update, modify and delete the address book. The contact directory information may be subscribed to by other CAB users, and the latest contact information can be published to other CAB users. After other CAB users subscribe to the information about a CAB user and are notified of the information, the CAB user is notified. In this way, the CAB user keeps aware of the relevant contact information, and the user experience is improved.

Figure 8:
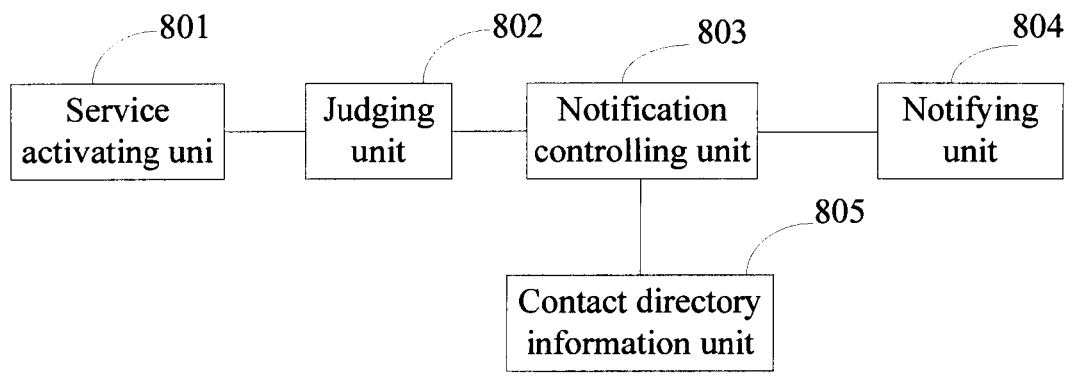
FIG. 8 shows a structure of an apparatus for notifying CAB service information in the third embodiment of the present invention.

FIG. 8 shows a structure of an apparatus for notifying CAB service information in the third apparatus embodiment of the present invention.

The apparatus includes a service activating unit 801, a judging unit 802, a notification controlling unit 803, a notifying unit 804, and optionally, an contact directory information unit 805, as detailed below:

The service activating unit 801 is configured to receive a message for activating a CAB service from a second user.

The judging unit 802 is configured to judge whether the second user is a contact specified in contact directory information of a first CAB user.

The notification controlling unit 803 is configured to determine whether it is necessary to notify the first CAB user according to instruction information of the first CAB user if a judgment result of the judging unit 802 is positive, and generate a notification message when it is necessary to notify the first CAB user.

The notifying unit 804 is configured to send the notification message generated by the notification controlling unit 803 to the first CAB user.

The contact directory information unit 805 is connected to the notification controlling unit 803, and is configured to receive and store the contact directory information published by the first CAB user and/or the instruction information of the first CAB user.

Likewise, the units in the apparatus for notifying CAB service information in this embodiment are categorized in terms of functions only. In practice, one or more of the units may be integrated on the same physical entity.

Through the apparatus for notifying CAB service information in this embodiment, the CAB user can publish his/her contact directory information (including personal information and address book information) to the corresponding server for storing, and can retrieve the address book from the corresponding server. Meanwhile, the CAB user can update, modify and delete the address book. The contact directory information may be subscribed to by other CAB users, and the latest contact information can be published to other CAB users. A CAB user can be notified of its contact change after the contact changes from a non-CAB user to a CAB user. Therefore, the CAB user keeps aware of the updated contact information and enjoys a better experience.

The embodiments of the invention are described in detail above to help understand the apparatus and method of the invention. It is apparent that those skilled in the art can make modifications and variations to the invention within the scope of the inventive concept. The specification shall not be construed as a limitation to the invention.

The above descriptions are merely preferred embodiments of the present invention, but are not intended to limit the scope of the present invention. Any modifications, variations or replacements that can be easily derived by those skilled in the art without departing from the spirit and scope of the invention shall fall within the scope of the present invention.

What is claimed is:

1. A non-transitory computer-readable medium comprising instructions, which, when executed by a computer, cause the computer to perform a method for notifying Converged Address Book (CAB) service information, the method comprising:

receiving a request message from a second CAB user, wherein the request message includes requested information about a first CAB user;

judging, whether sending information about the first CAB user to other users is allowed or whether other users are allowed to add the first CAB user as a contact by querying the first CAB user;

obtaining the requested information among stored information, and sending the requested information to the second CAB user, if sending the information about the first CAB user to other users is allowed or if the other users are allowed to add the first CAB user as a contact; and notifying the second CAB user if sending the information about the first CAB user to other users is not allowed or if other users are not allowed to add the first CAB user as a contact;

judging whether to notify the first CAB user according to at least one of the request message and instruction information of the first CAB user; and sending a notification message to the first CAB user if judging that the first CAB user is to be notified.

2. The non-transitory computer-readable medium according to claim 1, wherein the request message from the second CAB user is:

a request message which requests information published by the first CAB user; or a request message which requests adding of the first CAB user as the contact.

3. The non-transitory computer-readable medium according to claim 1, wherein the step of sending the notification message to the first CAB user comprises one of the group consisting of:

(a) sending a notification message to the first CAB user, wherein the notification message indicates that the second CAB user subscribes to the information published by the first CAB user;

(b) sending a notification message to the first CAB user, wherein the notification message requests the first CAB user to authorize to send the information that is published by the first CAB user and requested by the second CAB user to the second CAB user;

(c) sending a notification message to the first CAB user, wherein the notification message indicates that the second CAB user adds the first CAB user as a contact; and (d) sending a notification message to the first CAB user, wherein the notification message indicates that the information published by the first CAB user has been sent to the second CAB user.

4. The non-transitory computer-readable medium according to claim 2, further comprising:

receiving and storing at least one of contact directory information published by the first CAB user and the instruction information of the first CAB user.

5. The non-transitory computer-readable medium according to claim 1, further comprising:

recording the request message after receiving the request message from the second CAB user;

judging whether sending the information about the first CAB user to other users is allowed or whether other users are allowed to add the first CAB user as a contact is based on the recorded request message, after stored contact directory information of the first CAB user changes;

obtaining the requested information among the stored information, if sending the information about the first CAB user to other users is allowed or if other users are allowed to add the first CAB user as a contact, and sending the requested information to the second CAB user; and notifying the second CAB user if sending the information about the first CAB user to other users is not allowed or if other users are not allowed to add the first CAB user as a contact.

6. The non-transitory computer-readable medium according to claim 1, wherein:

the request message from the second CAB user is a SUBSCRIBE message; and the step of notifying the second CAB user comprises: notifying the second CAB user by a NOTIFY message.

7. The non-transitory computer-readable medium according to claim 1, wherein:
query policies comprise: querying rights information, storing and forwarding at least one of rights information, and security information.

8. The non-transitory computer-readable medium according to claim 7, further comprising:
judging whether to notify the first CAB user according to the instruction information of the first CAB user when a contact in the contact directory information of the first CAB user changes from a non-CAB user to a CAB user; and
sending a notification message to the first CAB user if determining to notify the first CAB user.

9. A non-transitory computer-readable medium according to claim 1, further comprising:
receiving a message for activating a CAB service from a third user;
judging whether to send a notification message according to instruction information of a first CAB user if the third user is a contact specified in contact directory information of the first CAB user; and
sending the notification message to the first CAB user if judging that the notification message is to be sent.

10. The non-transitory computer-readable medium according to claim 9, further comprising:
receiving and storing at least one of contact directory information published by the first CAB user and the instruction information of the first CAB user.

11. The non-transitory computer-readable medium according to claim 9, wherein:
the notification message is one or more of the following messages: Session Initiation Protocol (SIP) message, Hypertext Transfer Protocol (HTTP) message, Short Message Service (SMS) message, and signaling message.

12. An apparatus, having a processor, for notifying Converged Address Book (CAB) service information, comprising:
an information subscribing unit, configured to receive a request message from a second CAB user;
a first judging unit, connected to the information subscribing unit, and configured to: judge whether sending the contact directory information of a first CAB user to other users is allowed or whether the other users are allowed to add the first CAB user as a contact by querying the first CAB user after the information subscribing unit receives the request message from the second CAB user; and
a subscribed information sending unit, configured to obtain the information requested by the second CAB user among the information stored in the contact directory information and send the information to the second CAB user if a judgment result of the first judging unit is positive;
a notification controlling unit, connected to the information subscribing unit, and configured to determine whether notifying the first CAB user is necessary according to instruction information of the first CAB user, and generate a notification message when notifying the first CAB user is necessary; and
a notifying unit, configured to send the notification message generated by the notification controlling unit to the first CAB user.

13. The apparatus according to claim 12, wherein:
the request message received by the information subscribing unit from the second CAB user is: a request message that requests information published by the first CAB user, or a request message that requests adding of the first CAB user as a contact.

14. The apparatus according to claim 12, further comprising:
a contact directory information unit, connected to the notification controlling unit, and configured to receive and store at least one of contact directory information published by the first CAB user and the instruction information of the first CAB user.

15. The apparatus according to claim 12, further comprising a second judging unit, wherein:
the second judging unit is configured to judge whether sending information about the first CAB user to other users is allowed or whether other users are allowed to add the first CAB user as a contact, according to query policies set by the first CAB user or by querying the first CAB user after the contact directory information of the first CAB user in the contact directory information unit changes; and
the subscribed information sending unit is further configured to obtain the information requested by the second CAB user among the information stored in the contact directory information unit and send the information to the second CAB user if a judgment result of the second judging unit is positive.

16. The apparatus according to claim 14, wherein:
the notification controlling unit is further configured to: when a contact in the contact directory information of the first CAB user in the contact directory information unit changes from a non-CAB user to a CAB user, judge whether notifying the first CAB user is necessary according to the instruction information of the first CAB user, and generate the notification message when notifying the first CAB user is necessary.

17. The apparatus according to claim 12, further comprising:
a service activating unit, configured to receive a message for activating a CAB service from a third user;
a judging unit, connected to the service activating unit, and configured to judge whether the third user is a contact specified in the contact directory information of the first CAB user;
a notification controlling unit, configured to determine whether notifying the first CAB user is necessary according to instruction information of the first CAB user if a judgment result of the judging unit is positive, and generate a notification message when notifying the first CAB user is necessary; and
a notifying unit, configured to send the notification message generated by the notification controlling unit to the first CAB user.

18. The apparatus according to claim 17, further comprising:
a contact directory information unit, connected to the notification controlling unit, and configured to receive and store at least one of the contact directory information published by the first CAB user and the instruction information of the first CAB user.

* * * * *